Patented Aug. 26, 1952

2,608,533

UNITED STATES PATENT OFFICE 2,608,533

COMPOSITION AND METHOD FOR TESTING BIOLOGICAL FLUIDS

Richard M. Carson and Reuben R. Sacks, Dayton, Ohio

No Drawing. Application January 30, 1951, Serial No. 208,668

11 Claims. (Cl. 252—408)

This invention relates to a composition and method for testing biological fluids to determine the presence of reducing substances therein, and is designed primarily for determining the presence of and the amount of sugar in urine.

This application is a continuation in part of our copending application Serial No. 579,314, filed February 22, 1945, for Composition and Method for Testing Biological Fluids, now abandoned.

In the diagnosis and treatment of certain diseases it is essential to ascertain whether the urine or blood contains sugar or alcohol and the amount thereof. This is particularly true in the treatment of diabetes. No cure for that disease has been found but it can usually be controlled by the regulation of the diet or by the administration of insulin, or both. The character of the diet and/or the dosage of insulin are determined largely by the amount of sugar content in the urine, which may change from time to time. It is desirable therefore that the patient should be able to test his urine periodically to determine what if any change in treatment is necessary, such changes of course being made under the instructions from his physician. There are various materials and methods by which the urine may be so tested and some of these have been made available to diabetic patients in the form of equipment, or kits, intended for individual use in the home. These tests have not been well adapted for use in the home but have, for the most part at least, involved one or more objectionable characteristics. Usually the presence of sugar is indicated by the change in the color of the testing reagent and the amount of sugar is indicated by the particular shade of resulting color, and is determined by comparison with a color chart. Such a comparison by an untrained eye is apt to be inaccurate and the color chart sometimes fades to an extent which is unnoticed by the patient but seriously affects the determination. Some of the tests require the use of external heat, which not only produces highly objectionable odors but is inconvenient and subjects the patient to the danger of burns. Many such tests require considerable time for their completion. The materials required are usually expensive and in some instances lack stability and quickly deteriorate.

One object of the invention is to provide such a test which can be easily and accurately effected by the ordinary patient.

A further object of the invention is to provide such a test which can be effected without the application of external heat.

A further object of the invention is to provide such a test which does not require a comparison of colors.

A further object of the invention is to provide such a test which is both qualitative and quantitative.

A further object of the invention is to provide such a test which can be effected quickly and at a low cost.

A further object of the invention is to provide such a test in which the result will not be materially affected by other reducing substances in the fluid being tested.

A further object of the invention is to provide an improved reagent for effecting such a test.

A further object of the invention is to provide such a reagent which will react with the reducing substances in the fluid being tested to form a composition the color of which will be the same regardless of the quantity of the reducing substance present in the fluid.

A further object of the invention is to provide such a reagent the reaction of which with the reducing substance will be completed in a period of time determined by the amount of reducing substances present in the fluid being tested.

Other objects of the invention may appear as the reagent and method are described in detail.

In practising the invention we provide a testing medium or reagent in the form of a stabilized solution of a color indicator or color imparting agent which will react with a reducing agent such as sugar or alcohol to noticeably change color. Such a color indicator should be one which imparts definite color to a relatively dilute solution and which makes a definite and noticeable change in color when it reacts with a reducing agent. In this manner, the reducing reaction can go to substantial completion within a reasonable period of time and the presence and proportion of reducing agent in the biological fluid can be determined by the length of time for the reaction rather than by color gradation. For this purpose we have found that the desired results are obtained where we employ as the color indicator, a manganate of an alkali metal such as lithium, sodium, potassium, rubidium and cesium. Potassium or sodium manganate or a mixture thereof are preferably employed because they are more readily available at an economical cost.

The alkali metal manganate is prepared in aqueous solution and to stabilize the manganate we employ a stabilizing agent. The stabilizing agent should be alkali, it should dissolve readily in water and should not react with the alkali metal manganate nor should it interfere with or inhibit the reaction between the alkali metal manganate and the reducing agent. We accomplish the desired results by employing the hydroxide of an alkali metal. We prefer to employ sodium or potassium hydroxide or a mixture thereof because these are more readily available at an economical cost.

As previously indicated, the alkali metal manganate and alkali metal hydroxide are dissolved in water to provide the desired test reagent. The proportions may be varied within limits. However, we have found that the proportion of alkali metal manganate to alkali metal hydroxide in the solution should be approximately between 0.1% and 2.6% by weight. The solution may be prepared in concentrated form and later diluted with more water just prior to use or it may be prepared, packaged, shipped and stored for reasonable periods of time in the proportions for use. In either event, the aqueous solution or reagent when ready for use should contain approximately between 15% and 40% by weight of alkali metal hydroxide and approximately between 0.04% and 0.4% by weight of alkali metal manganate.

The several components of the solution may be prepared in any desired manner and then dissolved in the water in the desired concentrations. However, we have found that the reagent may be conveniently produced by preparing a strong solution of an alkali metal permanganate in distilled water and combining with this solution an alkali metal hydroxide in a quantity to produce a solution in which the proportion of alkali metal manganate will be between 0.1% and 2.6% by weight of the alkali metal hydroxide. The hydroxide and permanganate will react with the result that all of the permanganate will be converted to the manganate. Specific examples of reagents embodying our invention and the method of preparing them are as follows:

*Example No. 1*

0.1944 grams of chemically pure potassium permanganate ($KMnO_4$) are dissolved in approximately 20 cubic centimeters of distilled water and 32.22 grams of sodium hydroxide (NaOH) are added thereto and thoroughly mixed together. After the reaction is completed, further distilled water is added to the solution until the volume is increased to one hundred cubic centimeters. The final solution comprises a mixture of equal molecular parts of sodium manganate ($Na_2MnO_4$) and potassium manganate ($K_2MnO_4$) in a strong solution of sodium hydroxide (NaOH). This solution is stable and strongly oxidizing in character, is green in color and will react at room temperatures on a reducing substance in the fluid being tested to change its color to a reddish-brown. In preparing the reagent in accordance with the foregoing example, permanganates of any of the other alkali metals or mixtures thereof may be substituted for the potassium permanganate and hydroxides of any of the other alkali metals or mixtures thereof may be substituted for the sodium hydroxide.

*Example No. 2*

0.05 grams of chemically pure potassium permanganate is dissolved in approximately 15 cubic centimeters of distilled water and 15 grams of sodium hydroxide is added to the solution and thoroughly mixed therewith. After the reaction is completed, additional distilled water is added thereto so as to increase the total volume of water to eighty-five cubic centimeters. The resulting solution is stable and strongly oxidizing in character, is green in color and will react at room temperatures on a reducing substance in the fluid being tested.

In the foregoing example the permanganate of any of the other alkali metals or mixtures thereof may be substituted for the potassium permanganate and the hydroxide of any of the other alkali metals or mixtures thereof may be substituted for the sodium hydroxide. Also, instead of adding the full amount of distilled water as indicated the solution may be left in more concentrated form and packaged, shipped and stored in this fashion to be diluted to the indicated amount immediately prior to use.

*Example No. 3*

0.2 grams of chemically pure sodium permanganate is dissolved in approximately 15 cubic centimeters of distilled water and 25 grams of sodium hydroxide is added to the solution and thoroughly mixed hterewith. After the reaction is completed, additional distilled water is added thereto so as to increase the total volume of water to seventy-five cubic centimeters. The resulting solution is stable and strongly oxidizing in character, is green in color and will react at room temperatures on a reducing substance in the fluid being tested.

In the foregoing example the permanganate of any of the other alkali metals or mixtures thereof may be substituted for the sodium permanganate and the hydroxide of any of the other alkali metals or mixtures thereof may be substituted for the sodium hydroxide. Also, instead of adding the full amount of distilled water as indicated the solution may be left in more concentrated form and packaged, shipped and stored in this fashion to be diluted to the indicated amount immediately prior to use.

*Example No. 4*

0.3 grams of chemically pure potassium permanganate is dissolved in approximately 15 cubic centimeters of distilled water and 40 grams of potassium hydroxide is added to the solution and thoroughly mixed therewith. After the reaction is completed, additional distilled water is added thereto so as to increase the total volume of water to sixty cubic centimeters. The resulting solution is stable and strongly oxidizing in character, is green in color and will react at room temperatures on a reducing substance in the fluid being tested.

In the foregoing example the permanganate of any of the other alkali metals or mixtures thereof may be substituted for the potassium permanganate and the hydroxide of any of the other alkali metals or mixtures thereof may be substituted for the potassium hydroxide. Also, instead of adding the full amount of distilled water as indicated the solution may be left in more concentrated form and packaged, shipped and stored in this fashion to be diluted to the indicated amount immediately prior to use.

A reagent embodying our present invention and made in accordance with any of the foregoing examples is particularly useful in determining the presence of and the relative amount of sugar in urine but with minor modifications it may also be used for other similar tests such as testing blood for either sugar or alcohol or testing urine for alcohol. The method of testing may vary but we prefer to perform the test in the manner hereinafter described.

The sugar which, in the form of glucose, is present in varying amounts in diabetic urine is a strongly reducing substance which reacts with the oxidizing reagent to produce manganese dioxide ($MnO_2$), which is a precipitate of reddish brown color and changes the color of the solution from the original green to the easily distinguishable reddish brown. In making the tests the proportions of urine and the reagent are determined in part by the strength of the reagent and in part by the speed with which the reaction is to be effected. While the reaction is quickly completed it is not instantaneous and the time interval varies with the amount of sugar in the urine, the time required for completion decreasing as the amount of sugar increases. The reaction of the reagent with the sugar changes the color of the solution to the same reddish brown regardless of the amount of sugar present, and the amount of sugar present is indicated by the time required for the reaction to take place.

In making the test a few drops of urine are placed in a clean, dry, transparent receptacle of a suitable size and shape, preferably a test tube of one-half inch diameter. A predetermined quantity of the reagent is then added to the urine, preferably all at one time, and the time required for the mixture to change from a green color to a reddish brown color is noted. The proportion of urine to reagent may vary in accordance with the character of the reagent or the desired speed of reaction. For instance, with a reagent having the concentration above set forth in Example No. 1, it is preferable to place five drops of urine in the test tube and to add thereto one cubic centimeter of the reagent. It is customary to designate, or rate, the quantity of sugar present by numerals, usually followed by the word "plus," such as 1 plus, 2 plus, 3 plus and 4 plus, which cover a range suitable for tests by the patient. When a complete change of color takes place in twenty seconds or less the rating is 4 plus. If a complete change of color requires more than two minutes the amount of sugar is not of material importance and the result is considered negative. The time intervals corresponding to the several ratings are shown in the following table, which is furnished to the patient:

| Time | Quantity of Glucose Present |
| --- | --- |
| 0 to 20 sec | 4 plus 2% or more. |
| 20 to 40 sec | 3 plus 1%. |
| 40 to 1 min | 2 plus 0.75%. |
| 1 to 2 min | 1 plus 0.50%. |
| Over 2 min | Negative. |

Should the tests show a rating of 4 plus and it is desired to determine the actual percentage of sugar present, a second test may be made by diluting the urine with an equal amount of water and using the same amount of the reagent. The reaction is timed in the same manner as before but the result is multiplied by two.

While the reaction of the reagent on the sugar is sufficiently slow to permit proper timing it is completed in less time than is required to oxidize other reducing substances contained in the urine and therefore such other substances do not in any way interfere with the test.

The foregoing test for determining the presence and the quantity of sugar in urine contemplates using a reagent made in accordance with Example No. 1. It will be appreciated that reagents with varying proportions of alkali metal manganate and alkali metal hydroxide within the limits set forth above may also be employed and that the time of reaction will vary as the proportions of ingredients are varied. Thus, if the proportion of either the alkali metal hydroxide or the alkali metal manganate are increased within the indicated proportions, the reaction time is increased and vice versa. The reaction times of reagents of varying formulae may be readily determined by simple tests with a given quantity of urine having known percentages of sugar. It will also be understood that the reaction time will be changed by varying the relative amount of urine used in the tests. Thus, where a relatively larger quantity of urine is employed the reaction time will be speeded up.

From the foregoing, it will be appreciated that our test and our testing reagent is very simple in character. Its technique is easily acquired, no knowledge of chemical reactions is required and it is not necessary to compare various shades of colors with a color chart. Therefore, it is well suited for use by patients. Furthermore, the test requires very little equipment, no external heat and only one reagent. It is effected at room temperatures and produces no objectionable odors. Thus it is convenient for use in privacy in the home or when traveling. Moreover, the cost per test is low.

While we have described several examples of a preferred reagent and method of preparing and using the same we wish it to be understood that we do not wish it to be limited to the details thereof as various modifications may occur to persons skilled in the art.

We claim:

1. The method of testing a biological fluid which comprises adding to the fluid a solution of sodium manganate in an alkali metal hydroxide to oxidize the reducing substance in the fluid.

2. The method of testing a biological fluid which comprises adding to the fluid a reagent containing sodium manganate, potassium manganate and sodium hydroxide to oxidize a reducing agent in said fluid.

3. The method of testing a biological fluid which comprises adding to the fluid a reagent containing sodium manganate, potassium manganate and potassium hydroxide to oxidize a reducing agent in said fluid.

4. The method of testing urine for sugar which comprises dissolving potassium permanganate in water, adding sodium hydroxide to said solution to form an oxidizing reagent, placing a predetermined quantity of urine in a test tube, adding to said urine a predetermined quantity of said reagent.

5. A method of testing a biological fluid which comprises adding a sample of the fluid to a reagent containing sodium manganate, potassium manganate and sodium hydroxide to effect oxidization of the reducing substances in said fluid at a rate which will permit the time required for oxidization to be measured.

6. The method of testing a biological fluid which comprises mixing with the fluid an aqueous solution of approximately between 0.04% and 0.4% by weight of an alkali metal manganate and approximately between 15% and 40% by weight of an alkali metal hydroxide.

7. The method of testing a biological fluid which comprises mixing with the fluid an aqueous solution of approximately between 0.04% and 0.4% by weight of a manganate of a metal selected from the group consisting of sodium and potassium and approximately between 15% and 40% by weight of an hydroxide of a metal selected from the group consisting of sodium and potassium.

8. A reagent for determining the presence and proportions of reducing agents such as glucose in biological fluids by a marked change of color of the reagent within predetermined periods of time and without the application of external heat comprising an aqueous solution of an alkali metal manganate and of an alkali metal hydroxide in which the alkali metal manganate comprises approximately between 0.1% and 2.6% by weight of the alkali metal hydroxide.

9. A reagent for determining the presence and proportion of reducing agents such as glucose in biological fluids by a marked change of color of the reagent within predetermined periods of time and without the application of external heat comprising an aqueous solution of a manganate of a metal selected from the group consisting of sodium and potassium and an hydroxide of a metal selected from the group consisting of sodium and potassium in which the metallic manganate comprises approximately between 0.1% and 2.6% by weight of the metallic hydroxide.

10. A reagent for determining the presence and proportion of reducing agents such as glucose in biological fluids by a marked change of color of the reagent within predetermined periods of time and without the application of external heat comprising an aqueous solution of between approximately 0.04% and 0.4% by weight of alkali metal manganate and approximately between 15% and 40% by weight of an alkali metal hydroxide.

11. A reagent for determining the presence and proportion of reducing agents such as glucose in biological fluids by a marked change of color of the reagent within predetermined periods of time and without the application of external heat comprising an aqueous solution of approximately between 0.04% and 0.4% by weight of a manganate of a metal selected from the group consisting of sodium and potassium and approximately between 15% and 40% by weight of an hydroxide of a metal selected from the group consisting of sodium and potassium.

RICHARD M. CARSON.
REUBEN R. SAEKS.

REFERENCES CITED

The following references are of record in the file of this patent:

UNITED STATES PATENTS

| Number | Name | Date |
|---|---|---|
| 500,697 | Webb et al. | July 4, 1893 |
| 588,613 | Stuart | Aug. 24, 1897 |

OTHER REFERENCES

Mellor, Comprehensive Treatise on Inorganic and Theoretical Chemistry, 1932, vol. 12, Longman's Green & Co., N. Y., pps. 283, 284, 286 and 288.